United States Patent
Liu et al.

(10) Patent No.: US 10,241,637 B2
(45) Date of Patent: Mar. 26, 2019

(54) METHOD FOR REDUCING POWER CONSUMPTION IN ELECTRONIC DEVICES

(71) Applicant: Xiaomi Inc., Beijing (CN)

(72) Inventors: Ren Liu, Beijing (CN); Hao Yan, Beijing (CN); Jianchun Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 206 days.

(21) Appl. No.: 15/202,991

(22) Filed: Jul. 6, 2016

(65) Prior Publication Data

US 2017/0090683 A1    Mar. 30, 2017

(30) Foreign Application Priority Data

Sep. 30, 2015    (CN) .......................... 2015 1 0641838

(51) Int. Cl.
*G06F 3/048* (2013.01)
*G06F 3/0481* (2013.01)
(Continued)

(52) U.S. Cl.
CPC .............. *G06F 3/0481* (2013.01); *G06F 9/44* (2013.01); *G06F 9/451* (2018.02); *G06F 21/629* (2013.01); *H04M 1/67* (2013.01); *H04W 52/0251* (2013.01); *H04W 68/02* (2013.01); *G06F 2221/032* (2013.01); *Y02D 70/1262* (2018.01); *Y02D 70/142* (2018.01); *Y02D 70/144* (2018.01); *Y02D 70/166* (2018.01)

(58) Field of Classification Search
None
See application file for complete search history.

(56) References Cited

U.S. PATENT DOCUMENTS 8,990,579 B2    3/2015  Kim
9,032,321 B1 *  5/2015  Cohen ................... G06F 3/0484
                                              715/771
(Continued)

FOREIGN PATENT DOCUMENTS

CN    102279912 A    12/2011
CN    103024186 A     4/2013
(Continued)

OTHER PUBLICATIONS

Office Action dated Jan. 17, 2018 for Chinese Application No. 201510641838.3, 6 pages.
(Continued)

*Primary Examiner* — William C Trapanese
(74) *Attorney, Agent, or Firm* — Brinks Gilson & Lione

(57) ABSTRACT

Methods and devices are disclosed for delaying screen-on notification broadcasting. In one embodiment, a method for delaying screen-on notification broadcasting in a device comprises: detecting a display screen wakeup event for a display screen of the device, when the display screen wakeup event is detected and a current interface is a lock screen interface, intercepting a screen-on notification information broadcasted by an operating system of the device to applications running on the device, and when switching of the display screen from the lock screen interface into an unlocked interface after unlocking by a user is detected, sending the intercepted notification information to the applications.

13 Claims, 10 Drawing Sheets

(51) Int. Cl.
    *G06F 9/44*     (2018.01)
    *G06F 21/62*     (2013.01)
    *H04W 52/02*     (2009.01)
    *H04W 68/02*     (2009.01)
    *H04M 1/67*     (2006.01)
    *G06F 9/451*     (2018.01)

(56) References Cited

U.S. PATENT DOCUMENTS

| | | | |
|---|---|---|---|
| 2008/0220752 | A1 | 9/2008 | Forstall et al. |
| 2008/0222423 | A1* | 9/2008 | Rodriguez .............. G06F 21/31 713/182 |
| 2014/0295799 | A1 | 10/2014 | Kim |
| 2014/0366041 | A1 | 12/2014 | Stanley-Marbell et al. |

FOREIGN PATENT DOCUMENTS

| | | |
|---|---|---|
| CN | 103500306 A | 1/2014 |
| CN | 104199669 A | 12/2014 |
| CN | 104915123 A | 9/2015 |
| EP | 2 891 969 A1 | 7/2015 |
| JP | 2009-111759 A | 5/2009 |
| JP | 2013-114281 A | 6/2013 |
| JP | 2015-515039 A | 5/2015 |
| KR | 10-2014-0099734 A | 8/2014 |
| KR | 10-1790086 B1 | 10/2017 |
| RU | 2 519 522 C2 | 6/2014 |
| WO | WO 2015/131685 A1 | 9/2015 |

OTHER PUBLICATIONS

International Search Report dated Jul. 12, 2016 for International Application No. PCT/CN2015/099519, 4 pages.
English Translation of International Search Report dated Jul. 12, 2016 for International Application No. PCT/CN2015/099519, 4 pages.
Extended European Search Report dated Feb. 7, 2017 for European Application No. 16184983.1, 7 pages.
Office Action dated Nov. 21, 2017 for Japanese Application No. 2017-542263, 3 pages.
Office Action dated Feb. 27, 2017 for Korean Application No. 10-2016-7006425, 4 pages.
Office Action dated Jul. 26, 2017 for Russian Application No. 2016110028/07, 12 pages.
Examination Report dated May 23, 2018 for European Application No. 16184983.1, 7 pages.
Office Action dated May 31, 2018 for Mexican Application No. MX/a/2016/003770, 3 pages.

* cited by examiner

METHOD FOR REDUCING POWER CONSUMPTION IN ELECTRONIC DEVICES

CROSS-REFERENCE TO RELATED APPLICATIONS

This application is based upon and claims priority to Chinese Patent Application No. 201510641838.3, filed Sep. 30, 2015, the entire contents of which are incorporated herein by reference.

TECHNICAL FIELD

The present disclosure generally relates to the technical field of network communications, and more particularly, to methods and devices for delaying broadcast of screen-on notification to software components and applications.

BACKGROUND

With the continuous development of network communication technologies, smart phones are becoming even more widely used. In related arts, after a screen of a smart phone in standby mode is turned on (or waked up), and when the smart phone enters into a lock screen mode showing a lock screen interface on the screen and awaiting unlocking by a user, various application programs in the smart phone will typically receive a screen-on notification information broadcasted by an operating system of the smart phone. A series of application services will be triggered upon receiving the screen-on notification information. For example, applications may update application data. In such a way, the applications that have been running on the device will be ready for the user. However, if the screen of the smart phone is not unlocked after the screen is waked up, e.g., the user never intended to wake up the phone (accidental wakeup of the display screen) or has a change of mind, the series of application services triggered by the screen-on notification are not of any use, and the power of the smart phone is wasted.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method for delaying screen-on broadcasting in a terminal device is disclosed. The method comprises: detecting a display screen wakeup event for a display screen of the terminal device; when the display screen wakeup event is detected and a current interface of the display screen is a lock screen interface, intercepting a screen-on notification information broadcasted by an operating system of the terminal device to a plurality of applications running on the terminal device; and when switching of the display screen from the lock screen interface into an unlocked interface after unlocking by a user is detected, sending the intercepted notification information to the applications.

In another embodiment, a device for delaying screen-on notification broadcasting is disclosed. The device comprises: a memory having instructions installed therein; and one or more processors, when executing the instructions, configured to: detect a display screen wakeup event for a display screen of the device; when the display screen wakeup event is detected and a current interface of the display screen is a lock screen interface, intercept a screen-on notification information broadcasted by an operating system of the device to a plurality of applications running on the terminal device; and when switching of the display screen from the lock screen interface into an unlocked interface after unlocking by a user is detected, send the intercepted notification information to respective the applications.

In yet another embodiment, it is disclosed a non-transitory computer-readable storage medium having stored therein instructions that, when executed by a processor of a terminal device, causes the terminal device to: detect a display screen wakeup event for a display screen of the terminal device; when the display screen wakeup event is detected and a current interface of the display screen is a lock screen interface, intercepting a screen-on notification information broadcasted by an operating system of the terminal device to a plurality of applications running on the terminal device; and when switching of the display screen from the lock screen interface into an unlocked interface after unlocking by a user is detected, sending the intercepted notification information to the applications.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
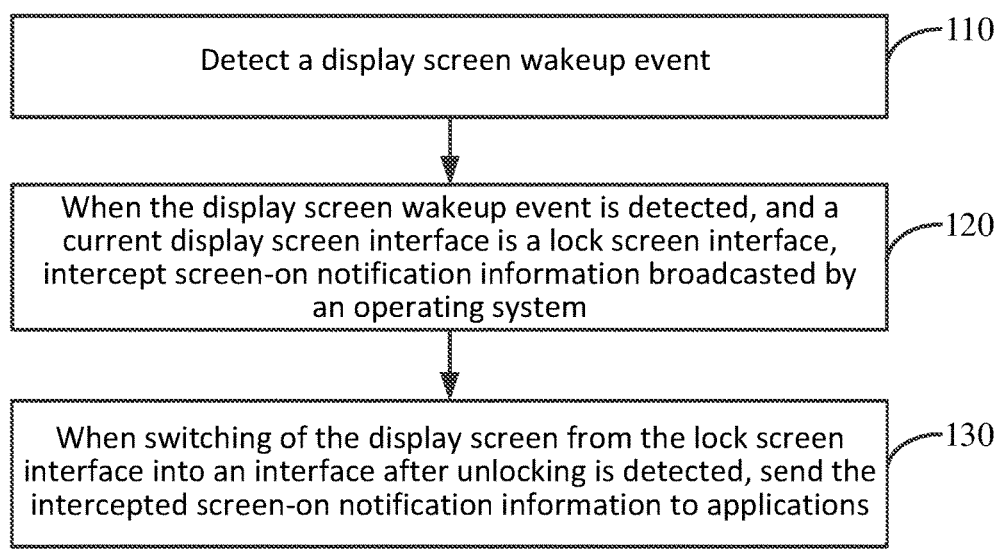
FIG. 1 is a flowchart showing a method for delaying screen-on notification broadcasting according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

The terminology used in the description of the disclosure herein is for the purpose of describing particular examples only and is not intended to be limiting. As used in the description of the disclosure and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items.

It shall be appreciated that although the present disclosure uses terminologies "first", "second", and "third" and the like to describe various information, the information shall not be limited by these terminologies. Using these terminologies is only for distinguishing information of the same type. For example, without departing from the scope of the present disclosure, the first information may be referred to as the second information, and similarly, the second information may be referred to as the first information. Depending on the context, the terminology "if" used herein may be interpreted as "when" or "in response to determining that."

By way of introduction, an electronic device may run an operating system and a series of applications. A user may view the output of the applications on a display screen. Additionally, the user may input instructions to the applications via a keyboard or touch screen. To save power, particularly for a mobile electronic device running on a battery, the entire electronic device or the display screen of the electronic device may enter a standby mode when the user is not actively operating it. The display screen may enter the standby mode after a predetermined period of inactivity by the user. Alternatively, the user may decide to put the entire electronic device or the display screen in standby mode by pressing a button on the electronic device. In the standby mode, the display screen is turned off and the operating system and applications may be kept in inactive mode awaiting user activities. When the user wakes up the display screen by, for example, pressing a wakeup button on the electronic device, the display is turned on and the device may enters into a lock screen mode. A lock screen mode is a widely used security feature for keeping the content of electronic device from individuals other than the owner of the device. Specifically, the display screen may show an interface prompting the user to unlock the screen by, for example, swiping a sliding bar and then entering a passcode. Alternatively, the lock screen interface may prompt the user to place her finger on the screen for fingerprint recognition. The operating system may broadcast a screen-on notification information to the applications upon wakeup of the display screen and before an unlocking of the display screen. The applications may begin updating application data or perform other operations once the screen-on notification broadcast is received. As an example, the screen-on notification broadcast may be an android.intent.action.SCREEN_ON notification in an electronic device installed with Google's Android operating system. In the case that the wakeup of the screen by the user is accidental or the user changes her mind after waking up the screen but decides against unlocking the screen, the activities performed by the operating system in sending screen-on notification broadcast and the applications in updating application data upon receiving the screen-on notification would be a waste, leading to unnecessary power consumption. In the various embodiments disclosed below, the screen-on notification is intercepted and temporarily kept until the user actually unlocks the screen. The embodiments disclosed below thus help reducing the power consumption of the electronic device. The interception of screen-on notification herein is only exemplary. Other notifications that may be broadcasted to applications may be similarly intercepted for reducing the power consumption of the electronic device and are thus within the scope of the present disclosure.

FIG. 1 is a flowchart showing a method for delaying screen-on notification information broadcasting according to an exemplary embodiment of the present disclosure. The method may be applied in any terminal device such as a mobile phone, a tablet computer, a Personal Digital Assistant (PDA), a Personal Computer (PC), and the like. The terminal may access a router via a wireless local area network and thereby accesses a serve on a public network via the router. In step 110, a display screen wakeup event is detected. Specifically, the terminal detects a display screen wakeup operation by a user. Once the user operation is detected and the screen is turned on, the terminal deems that the display screen wakeup event has occurred. For example, the terminal may be a smart phone and a user may press a preset key to wake up the screen of the smart phone. When the smart phone detects that the screen switches from a black screen to a bright screen, it determines that the display screen wakeup event is detected.

In step 120, when the display screen wakeup event is detected, and a current interface of the display screen is a lock screen interface, a screen-on notification broadcasted by an operating system is intercepted. In more detail, after the screen of the terminal is turned on and if the user has set a lock screen, the terminal display enters into a lock screen interface. In related arts, after the screen of the terminal is turned on, and the terminal enters into a lock screen interface, application programs that have been running in the terminal will receive screen-on notification information broadcasted by the operating system. In response to the notification, a series of application services will be triggered. If the wakeup and turning on of the display screen of the terminal is accidental or the user does not intend to proceed to unlock the screen and use the terminal, the series of application services triggered by the broadcasted screen-on notification information are not of any use, leading to power waste. In order to reduce and optimize the power consumption of the terminal, in step 120 of the embodiment of FIG. 1, when the terminal detects a display screen wakeup event and enters into a lock screen mode, the terminal intercepts screen-on notification information broadcasted by the operating system so that the application programs running in the terminal will not receive the notification while the terminal is still in the lock screen mode. Thus, triggering of the series of application services immediately upon display screen wakeup is avoided.

In step 130, when user unlocks the display screen and a switching of the display screen from the lock screen interface into an unlocked display screen interface is detected by the terminal, the intercepted screen-on notification information is released and sent to running applications so that the applications can trigger the series of application services after the display screen of the terminal is unlocked.

Thus, in the embodiment of FIG. 1, the terminal detects a display screen wakeup event and when the display screen wakeup event is detected and the current display interface is the lock screen interface, the terminal intercepts the screen-on notification information broadcasted by the operating system. When the display screen switches from the lock screen interface into the unlocked interface upon unlocking of the terminal by the user, the terminal sends the intercepted screen-on notification information to application programs. In this way, when the terminal is still in the lock screen state prior to being unlocked by the user, the terminal postpones the broadcasting of the screen-on notification information. Thus, the running of application services will not be triggered when the terminal is still in the lock screen mode. The running of application services is only triggered after the terminal is unlocked. Power consumption is therefore optimized for the situation where the screen is not unlocked after it is waked up.

Figure 2:
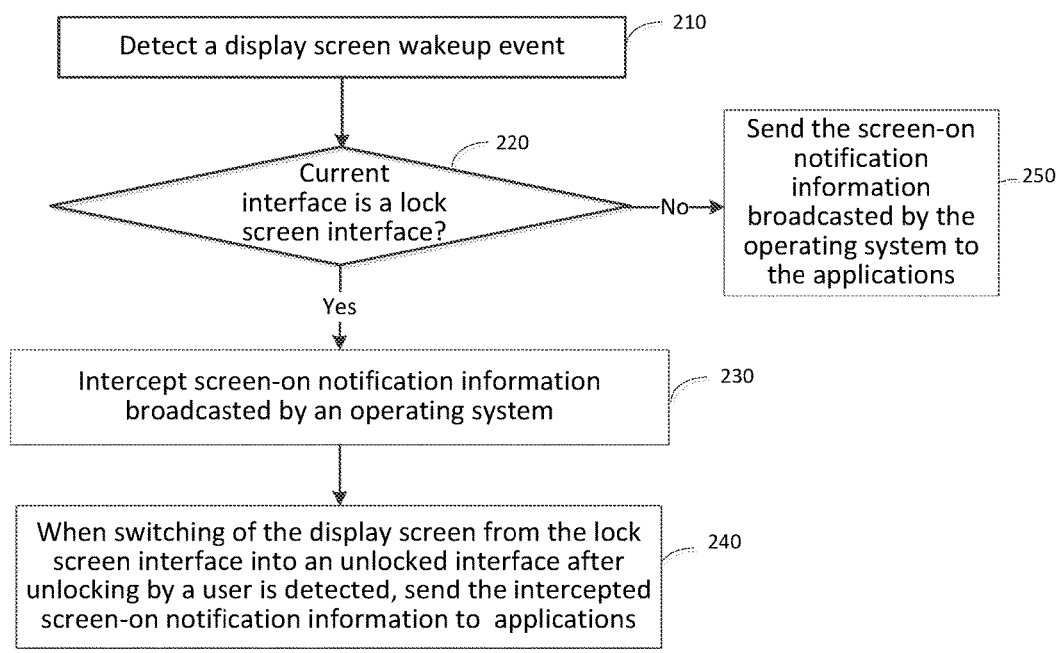
FIG. 2 is a flowchart showing another method for delaying screen-on notification broadcasting according to an exemplary embodiment of the present disclosure.

FIG. 2 is a flowchart showing another method for delaying screen-on notification information broadcasting according to an exemplary embodiment. In step 210, a display screen wakeup event is detected. In step 220, whether the current display interface is a lock screen interface is determined. If the current display interface is the lock screen interface, step 230 is performed. If the current interface is not the lock screen interface, step 250 is performed. In step 230, the screen-on notification information broadcasted by the operating system is intercepted. In step 240, when the user unlock the screen and the terminal detects a switching of the display screen from the lock screen interface into an unlocked interface, the intercepted screen-on notification is released and sent to the running applications. Steps 230 and 240 are similar to step 120 and 130 of FIG. 1. Relevant description above for FIG. 1 applies. In step 250, the screen-on notification information broadcasted by the operating system is sent to the application programs in the case that the user did not set up a lock screen interface.

Thus, in embodiment of FIG. 2, after the screen of the terminal is waked up and turned on, if the user does not set a lock screen, the terminal enters the unlocked display interface, and the applications running in the terminal will receive the screen-on notification information broadcasted by the operating system and trigger the series of application services in response to the received notification information. In this situation, the screen-on notification information broadcasted by the operating system is directly sent to the applications rather than being intercepted. However, after the screen of the terminal is waked up and turned on, the screen-on notification information is intercepted if the terminal enters into the lock screen interface. Thus, in this embodiment, whether to delay broadcasting screen-on notification is flexibly implemented, and the power consumption for the terminal is also reduced.

In the embodiments of FIG. 1 and FIG. 2 above, after step 120 or 230, the methods may further include storing the intercepted screen-on notification information in a memory buffer. Correspondingly, after storing the intercepted notification information in the buffer, step 130 or 240 may correspondingly comprise sending the screen-on notification information stored in the buffer to the applications when a switching of the display screen from the lock screen interface into an unlocked interface is detected.

Furthermore, the stored intercepted screen-on notification information may be deleted from the memory buffer when a switching of the display screen from the lock screen interface to the unlocked interface is not detected within a preset period of time because it indicate that either the wakeup of the display screen is accidental, or the user has a change of mind and decides not to unlock the display screen, or the user may have forgotten her passcode.

Thus, the terminal may store the intercepted screen-on notification information in a memory buffer, and delete the stored notification information in the buffer when switching of the display screen from the lock screen interface into the unlocked interface is not detected within a preset time.

Figure 3:
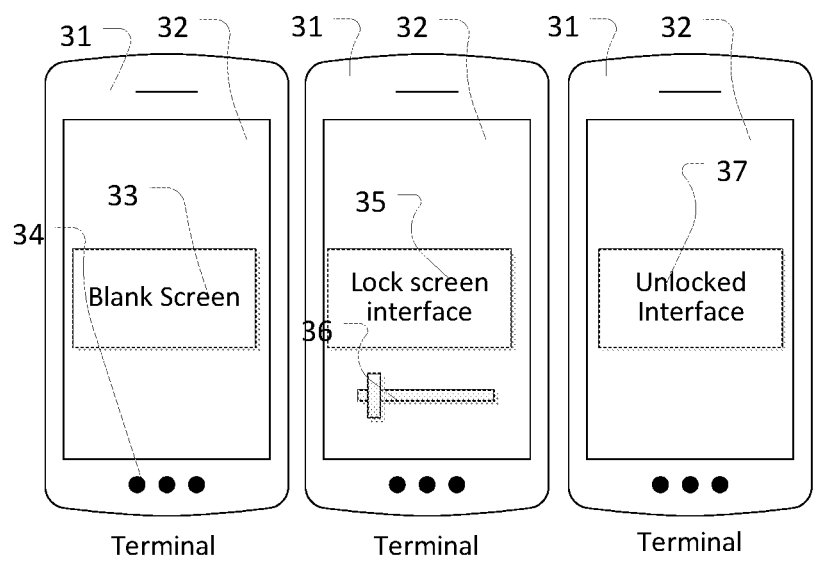
FIG. 3 is a schematic diagram of an example terminal device suitable for implementing a method for delaying screen-on notification broadcasting according to an exemplary embodiment of the present disclosure.

FIG. 3 is schematic diagram showing an application scenario of a method for delaying screen-on notification broadcasting according to an exemplary embodiment of the present disclosure. The application scenario includes a terminal 31 with a display screen 32 initially blank, shown by 33. The terminal may perform: detecting a display screen wakeup operation for turning on the display screen of the terminal 32 by a user via, for example, pressing the wakeup button 34; when the display screen wakeup operation is detected, and the display screen of the terminal is in a display screen wakeup and lock interface 35, intercepting screen-on notification information broadcasted by the operating system of the terminal; and when switching of the display screen from the lock screen interface 35 into an unlocked interface 37 by the user unlocking the display screen by swiping the sliding bar 36 and entering a passcode, sending the intercepted screen-on notification information to the applications.

As an example, the method above may be implemented in a mobile device installed with a Google Android operating system. The operating system may be modified to implement the method for delaying screen-on broadcast. Specifically, the operating system may direct the display screen to be turned off when the mobile device is not being actively used. The screen-off event may be broadcasted to various applications running in the mobile device. The applications may be designed to enter a power-saving mode upon receiving the screen-off message by restraining from various background activities, network activities, or other CPU-intensive operations. When the display screen is waked up by the user, the operating system may generate a screen-on message to be broadcasted to the applications in the form of an Android intent message, such as android.intent.action.SCREEN_ON. The screen-on broadcast message may be placed in a broadcast message queue and be dispatched to all applications. Each application may be designed to have a broadcast receiver for analyzing a received broadcast message and respond accordingly. For example, an application may be designed restart its restrained activities upon receiving a screen-on broadcast message. Using the method above, the screen-on broadcast message generated by the operating system upon the turning-on of the screen may be intercepted and placed in a separate memory buffer rather than the broadcast message queue. Alternatively, the redirection of the screen-on message into the separate buffer may be performed only if the operating system determines that a screen lock has been set up and the user needs to unlock the screen before using the mobile device. Upon successful unlocking of the display screen, the screen-on broadcast message is moved back into the broadcast message queue for dispatching to the applications. In such a manner, the screen-on message is not immediately dispatched and broadcasted to the applications prior to unlocking of the screen. The applications thus only resume its activities being restrained during screen-off upon successful unlocking of the screen. If the screen is not unlocked for a predetermined period of time, the screen-on message placed in the separate buffer may be removed.

Corresponding to the above embodiments of methods for delaying screen-on notification broadcasting, the present disclosure further provides embodiments of devices for delaying screen-on notification broadcasting. The modules and circuitry described herein with respect to FIGS. 4-10 may all be implemented in the terminal 31 of FIG. 3 in one implementation.

Figure 4:
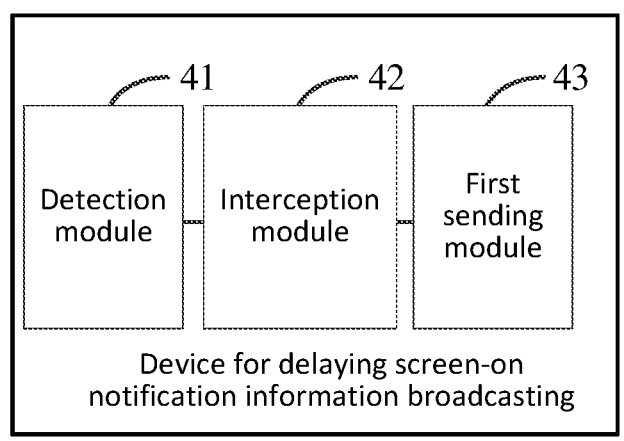
FIG. 4 is a block diagram showing a device for delaying screen-on notification broadcasting according to an exemplary embodiment of the present disclosure.

FIG. 4 is a block diagram showing a device for delaying screen-on notification broadcasting according to an exemplary embodiment of the present disclosure. The device may be included in the terminal and is configured to perform the methods for delaying screen-on notification broadcasting as shown in FIGS. 1 and 2. The device may include a detection module 41, an interception module 42 and a first sending module 43. The detection module 41 is configured to detect a display screen wakeup event. The interception module 42 is configured to, when the display screen wakeup event is detected by the detection module 41, and a current interface is a lock screen interface, intercept screen-on notification information broadcasted by an operating system of the terminal. The first sending module 43 is configured to, upon a switching of the display screen from the lock screen interface into an unlocked interface after the screen is unlocked by the user, send the intercepted screen-on notification information to applications running on the terminal.

Thus, in the device embodiment of FIG. 4, a terminal detects a display screen wakeup event; when the display screen wakeup event is detected, and the current display screen interface is a lock screen interface, the terminal intercepts screen-on notification information broadcasted by the operating system; and when a switching of the display screen from the lock screen interface into the unlocked interface after unlocking by the user is detected, the terminal sends the intercepted screen-on notification information to applications running on the terminal. In this way, when the terminal is in the lock screen mode, the terminal postpones the sending of the screen-on notification information, and thereby running of services of the applications is not triggered when the terminal is in the lock screen state. Thus, the screen-on notification is sent to the applications and can trigger running of the services only after the display screen of the terminal is unlocked. Power consumption of the terminal is thus optimized.

Figure 5:
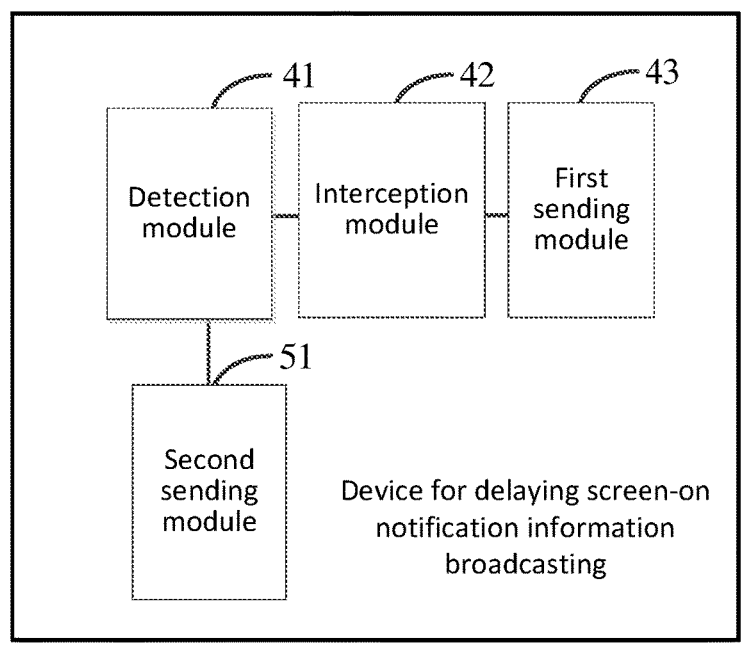
FIG. 5 is a block diagram showing another device for delaying screen-on notification broadcasting according to an exemplary embodiment of the present disclosure.

FIG. 5 is a block diagram showing another device for delaying screen-on notification broadcasting according to an exemplary embodiment of the present disclosure. The device may be included in a terminal. The device of FIG. 5 is based on the device as shown in FIG. 4 and may further include a second sending module 51. The second sending module 51 is configured to, when the display screen wakeup event is detected by the detection module 41 and the current interface is not the lock screen interface, send the system wakeup notification information broadcasted by the operating system to the applications running on the terminal. Thus, after the screen of the terminal is turned on, if the display screen is in a lock screen interface, the screen-on notification information is intercepted, and if the display screen is not in the lock screen interface, the screen-on notification information is not intercepted.

Figure 6:
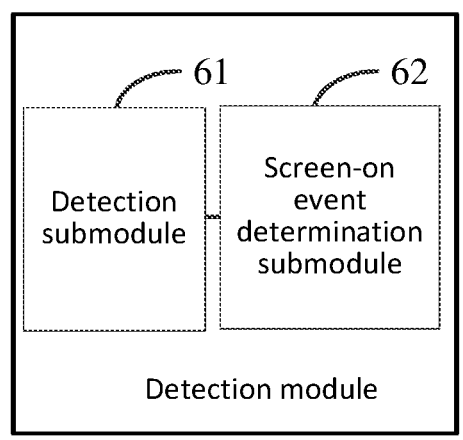
FIG. 6 is a block diagram showing another device for delaying screen-on notification broadcasting according to an exemplary embodiment of the present disclosure.

FIG. 6 is a block diagram showing another device for delaying screen-on notification broadcasting according to an exemplary embodiment of the present disclosure. The device may be included in a terminal. The device of FIG. 5 is based on the device as shown in FIG. 4 and the detection module 41 may include a detection submodule 61 and a display screen wakeup event determination submodule 62. The detection submodule 61 is configured to detect a display screen wakeup operation for turning on the screen of the terminal by a user. The display screen wakeup event determination submodule 62 is configured to, when the display screen wakeup operation is detected, and the screen of the terminal is in a display screen wakeup state, determine the display screen wakeup operation as the display screen wakeup event.

Figure 7:
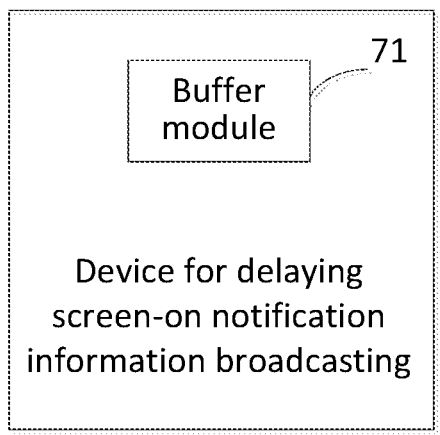
FIG. 7 is a block diagram showing another device for delaying screen-on notification broadcasting according to an exemplary embodiment of the present disclosure.

FIG. 7 is a block diagram showing another device for delaying screen-on notification information broadcasting according to an exemplary embodiment of the present disclosure. The device may be included in a terminal. The device of FIG. 7 is based on and includes all modules of the device as shown in FIG. 4. The device of FIG. 7 may further include a buffer module 71 configured to, after the screen-on notification information broadcasted by the operating system is intercepted, store the intercepted screen-on notification information in a buffer.

Figure 8:
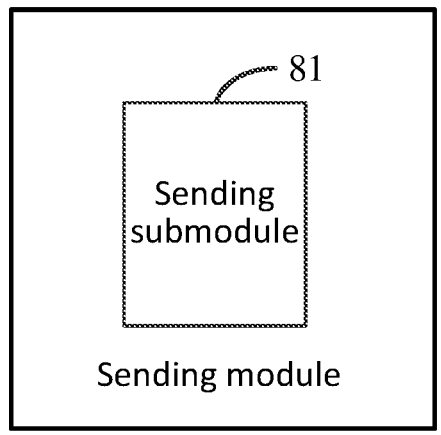
FIG. 8 is a block diagram showing another device for delaying screen-on notification broadcasting according to an exemplary embodiment of the present disclosure.

FIG. 8 is a block diagram showing another device for delaying screen-on notification broadcasting according to an exemplary embodiment of the present disclosure. The device may be included in a terminal. The device of FIG. 8 is based on the device as shown in FIG. 7 wherein the sending module 43 may further include a sending submodule 81 configured to, when the switching of the display screen from the lock screen interface to the unlocked interface after unlocking by user is detected, send the screen-on notification information stored in the buffer to the applications running on the terminal.

Figure 9:
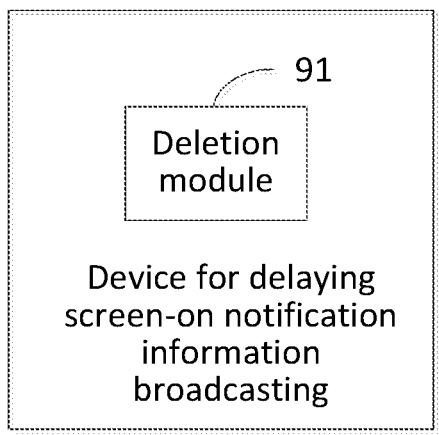
FIG. 9 is a block diagram showing another device for delaying screen-on notification broadcasting according to an exemplary embodiment of the present disclosure.

FIG. 9 is a block diagram showing another device for delaying screen-on notification broadcasting according to an exemplary embodiment of the present disclosure. The device may be included in a terminal. The device of FIG. 9 is based on the device as shown in FIG. 7 and may further include a deletion module 91 configured to, when the switching of the display screen from the lock screen interface into the unlocked interface is not detected within a preset time, delete the screen-on notification information stored in the buffer.

Thus, in the embodiments above, the terminal may store the intercepted screen-on notification information in a buffer, and delete the stored notification information in the buffer when switching of the display screen from the lock screen interface into an unlocked interface is not detected within a preset time.

Device of FIG. 4 corresponds to another embodiment of a device for delaying screen-on notification broadcasting. The device comprises a processor, and a memory for storing instructions executable by the processor, wherein the processor, when executing the instructions, is configured to: detect a display screen wakeup event, when the display screen wakeup event is detected and a current interface of the display screen is a lock screen interface, intercept screen-on notification information broadcasted by an operating system of the device, and when switching of the display screen from the lock screen interface into an unlocked interface after unlocking by a user is detected, send the intercepted screen-on notification information to applications running on the device. The description of the device of FIG. 4 applies to the device above.

The embodiments of devices above basically correspond to the embodiments of methods, and thus description about the embodiments of methods applies to the device embodiments. The above described embodiments of devices are only illustrative, and portions described as separated units may be or may not be physically separated. The portions shown as units may be or may not be physical modules, i.e., the portions may be located at one place, or may be distributed over a plurality of network units. A part or whole of the modules may be selected to realize the objectives of the technical solutions of the present disclosure according to actual requirements. One of ordinary skill in this art may understand and practice the technical solutions of the present disclosure without creative work.

Figure 10:
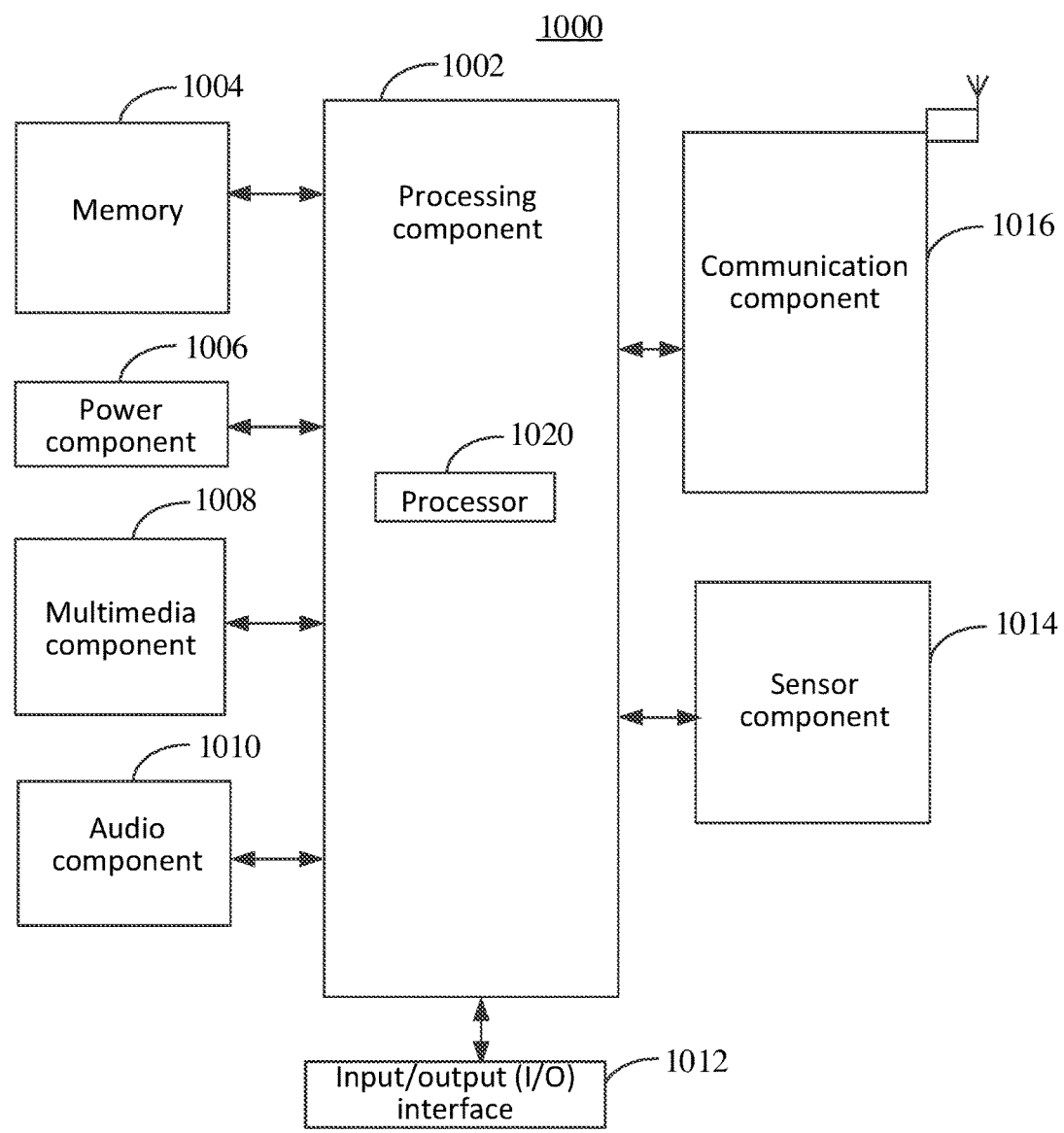
FIG. 10 is a block diagram showing yet another device for delaying screen-on notification broadcasting according to an exemplary embodiment of the present disclosure.

FIG. 10 is block diagram showing an embodiment of a terminal side device 1000 for delaying screen-on notification broadcasting according to an exemplary embodiment of the present disclosure. The device 1000 may be a mobile phone, a computer, a digital broadcast terminal, a messaging device, a gaming console, a tablet, a medical device, exercise equipment, a personal digital assistant, and the like.

Referring to FIG. 10, the device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 controls overall operations of the device 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the device 1000. Examples of such data include instructions for any applications or methods operated on the device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the device 1000.

The multimedia component 1008 includes a display screen providing an output interface between the electronic device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive an external multimedia data while the device 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 may include a microphone ("MIC") configured to receive an external audio signal when the device 1000 is in an operation mode, such as a call mode, a recording mode, and a voice recognition mode. The received audio signal may be further stored in the memory 1004 or transmitted via the communication component 1016.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the device 1000. For instance, the sensor component 1014 may detect an open/closed status of the device 1000, relative positioning of components, e.g., the display and the keypad, of the device 1000, a change in position of the device 1000 or a component of the device 1000, a presence or absence of user contact with the device 1000, an orientation or an acceleration/deceleration of the device 1000, and a change in temperature of the device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor or thermometer.

The communication component 1016 is configured to facilitate communication, wired or wirelessly, between the device 1000 and other devices. The device 1000 can access a wireless network based on a communication standard, such as WiFi, 2G, 3G, LTE or 4G cellular technologies, or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1004, executable by the processor 1020 in the device 1000, for performing the above-described methods. For example, the non-transitory computer-readable storage medium may be a ROM, a RAM, a CD-ROM, a magnetic tape, a floppy disc, an optical data storage device, and the like.

Each module or unit discussed above for FIG. 4-9, such as the detection module, the interception module, the first sending module, the second sending module, the detection submodule, the screen-on event determination submodule, the buffer module, the sending submodule, and the deletion submodule, may take the form of a packaged functional hardware unit designed for use with other components, a portion of a program code (e.g., software or firmware) executable by the processor 1020 or the processing circuitry that usually performs a particular function of related functions, or a self-contained hardware or software component that interfaces with a larger system, for example.

As an alternative to the embodiments above, delay of response by applications to a screen-on event may be achieved by modifying the timing of the generation of the broadcast message by the operating system rather than by intercepting the generated broadcast message and delay its receipt by applications. For example, the Doze feature provided in Google Android operating system allows the mobile device to enter a low-power consumption mode in which the applications is restrained from performing power intense operations. When the mobile device exits the Doze mode (upon, for example, a user screen-wake operation), various broadcast messages may be sent to the applications. In response to these broadcast messages, the applications may resume the power intense operations. According to the principle disclosed herein, the timing of exit from the Doze mode may be modified to correspond to the time that the display screen is unlocked rather than the time of the screen-on event. Thus, broadcast messages will only be generated upon unlocking of the screen. Thus, the generation of the broadcast message may be delayed. If the screen-on action is accidental or the user decides not to unlock the display screen after turning on the display screen, broadcast message to various applications would not be generated in the first instance and unintended resumption of power intense operations by the applications is avoided.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It will be appreciated that the present invention is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for delaying screen-on broadcasting in a terminal device, comprising:
    detecting, by an operating system of the terminal device, a display screen wakeup event for a display screen of the terminal device;
    displaying a wakeup display screen interface and generating, by the operating system, a screen-on broadcasting notification upon detecting the display screen wakeup event;
    determining whether the wakeup display screen interface is a lock screen interface;
    when the wakeup display screen interface is a lock screen interface:
        intercepting, by the operating system, the screen-on broadcasting notification to applications running on the terminal device such that the applications are not waked up by the screen-on broadcasting notification during a time period between the display screen wakeup event and unlocking of the lock screen interface by a user of the terminal device; and
        upon detecting unlocking of the lock screen interface by the user, switching the display screen from the lock screen interface to an unlocked interface and sending, by the operating system, the intercepted screen-on broadcasting notification to the applications; and
    when the wakeup display screen interface is not the lock screen interface, sending the screen-on broadcasting notification to the applications by the operating system without being intercepted.

2. The method according to claim 1, wherein detecting the display screen wakeup event comprises:
    detecting a display screen wakeup operation for turning on the display screen of the terminal device by the user; and
    when the display screen wakeup operation is detected, and the display screen of the terminal device is on, identifying the detected display screen wakeup operation as the display screen wakeup event.

3. The method according to claim 1, wherein the screen-on broadcasting notification comprises a display screen wakeup notification.

4. The method according to claim 1, wherein after intercepting the screen-on broadcasting notification, the method further comprises:
    storing the intercepted screen-on broadcasting notification in a memory buffer.

5. The method according to claim 4, wherein when the switching of the display screen from the lock screen interface to the unlocked interface after unlocking of the locks screen interface by the user is detected, sending the intercepted screen-on broadcasting notification stored in the memory buffer to the applications.

6. The method according to claim 4, further comprising:
    deleting the screen-on broadcasting notification stored in the memory buffer when the switching of the display screen from the lock screen interface into the unlocked interface is not detected within a preset length of time.

7. A device for delaying screen-on broadcasting notification, comprising:
    a memory having instructions installed therein for an operating system and applications;
    a display screen; and
    one or more processors in communication with the memory and the display screen, the one or more processors configured to:
        detect, via the operating system, a display screen wakeup event for the display screen;
        display a wakeup display screen interface and generate, via the operating system, a screen-on broadcasting notification upon detecting the display screen wakeup event;

determine whether the wakeup display screen interface is a lock screen interface;

when the wakeup display screen interface is a lock screen interface:

intercept, via the operating system, a screen-on broadcasting notification to applications running on the device such that the applications are not waked up by the screen-on broadcasting notification during a time period between the display screen wakeup event and unlocking of the lock screen interface by a user of the device; and upon detecting unlocking of the lock screen interface by the user, switch the display screen from the lock screen interface to an unlocked interface and send, via the operating system, the intercepted screen-on broadcasting notification to the applications; and when the wakeup display screen interface is not the lock screen interface, send the screen-on broadcasting notification to the applications by the operating system without being intercepted.

8. The device according to claim 7, wherein to detect the display screen wakeup event, the one or more processors are configured to:

detect a display screen wakeup operation for turning on the display screen of the device by the user; and when the display screen wakeup operation is detected, and the display screen of the device is on, regard the detected display screen wakeup operation as the display screen wakeup event.

9. The device according to claim 7, wherein the screen-on broadcasting notification comprises display screen wakeup notification.

10. The device according to claim 7, wherein, the one or more processors are further configured to:

store the intercepted screen-on broadcasting notification in a memory buffer.

11. The device according to claim 10, wherein to send the intercepted screen-on broadcasting notification to the applications, the one or more processors are configured to:

send the screen-on broadcasting notification stored in the memory buffer to the applications when the switching of the display screen from the lock screen interface to the unlocked interface after unlocking of the locks screen interface by the user is detected.

12. The device according to claim 10, wherein the one ore more processors are further configured to:

delete the screen-on broadcasting notification stored in the memory buffer when the switching of the display screen from the lock screen interface into the unlocked interface is not detected within a preset length of time.

13. A non-transitory computer-readable storage medium having stored therein instructions that, when executed by a processor of a terminal device, causes the terminal device to:

detect, via an operating system of the terminal device, a display screen wakeup event for a display screen of the terminal device;

display a wakeup display screen interface and generate, via the operating system, a screen-on broadcasting notification upon detecting the display screen wakeup event;

determining whether the wakeup display screen interface is a lock screen interface;

when the wakeup display screen interface is a lock screen interface:

intercept, by the operating system, the screen-on broadcasting notification to a plurality of applications running on the terminal device such that the plurality of applications are not waked up by the screen-on broadcasting notification during a time period between the display screen wakeup event and unlocking of the lock screen interface by a user of the terminal device; and upon detecting unlocking of the lock screen interface by the user, switch the display screen from the lock screen interface to an unlocked interface and send, by the operating system, the intercepted screen-on broadcasting notification to the plurality of applications; and when the wakeup display screen interface is not the lock screen interface, sending the screen-on broadcasting notification to the applications by the operating system without being intercepted.

* * * * *